June 12, 1951  F. J. SCHWEITZER, JR  2,556,557
THERMIC VALVE
Filed May 7, 1945

Frank J. Schweitzer, Jr.,
INVENTOR;
By his attorney,
Frederick E. Maynard

Patented June 12, 1951

2,556,557

UNITED STATES PATENT OFFICE 2,556,557

THERMIC VALVE

Frank J. Schweitzer, Jr., Brea, Calif.

Application May 7, 1945, Serial No. 592,504

1 Claim. (Cl. 251—27)

This discovery is an advance in the art of fluid-control valve construction and the inventional concept resides in the incorporation of thermic means to reduce the viscosity of certain liquids.

In the oil field industry certain types of control valves are employed to closely restrict the flow of crude oils: which frequently carry a constituent of a highly waxy nature, such as paraffin. This last named material tends to effectively collect in and choke such valves; these being well known in the art as flow beans.

It is a purpose of this invention to provide a thermic valve device having the utility of so heating the liquid passing through the valve orifice that the viscosity of the objectional gumming agent carried therein will be effectively decreased to an extent that will overcome the choking of the valve flow by accretion in the orifice.

An object is to provide a thermic valve of extreme simplicity, low cost of construction, which is reliable in action, is easy of part replacement and renewal, and of long life of parts.

Another object of the invention is to provide a flow-bean heater assembly applicable to current, extensively used and stocked flow beans by mere replacement of the prior bean tip and stem unit.

The invention consists in certain advancements in this art, for the purposes set forth and adaptations thereof, as ensuingly disclosed and having, with the above, additional objects and advantages hereinafter developed, and whose constructions, combinations and sub-combinations, and details of means, and the manner of operation will be made manifest in the following description of the herewith illustrative apparatus; it being understood that modifications, variations and adaptations may be resorted to within the scope, spirit and principles of the invention as it is more directly claimed presently.

Figures 1, 2:
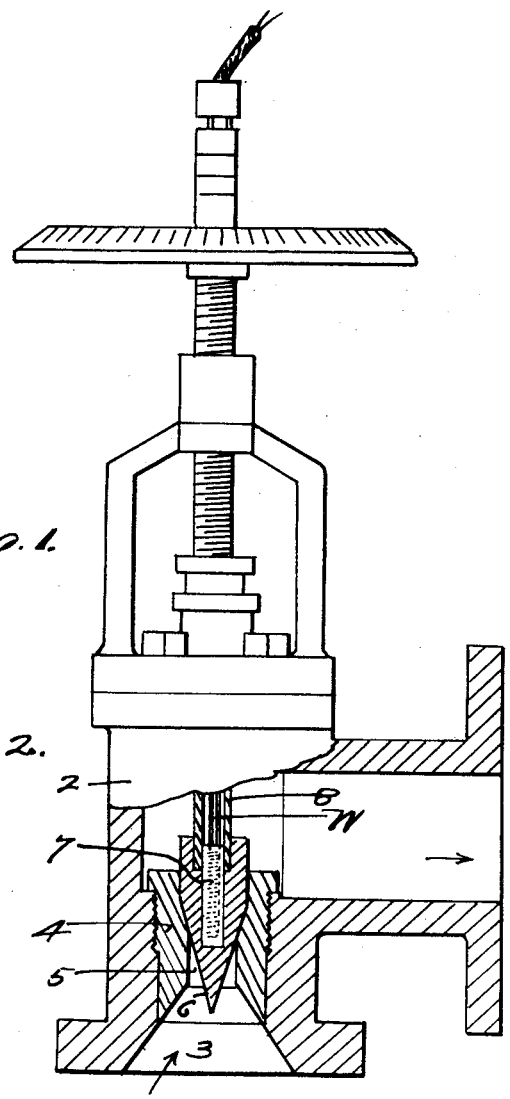
Figure 1 is a sectional elevation of a flow bean incorporating the heating concept.
Figure 2 is a sectional view of a valve seat ring embodying a heater unit.

The valve includes a shell 2 with an intake passage 3 in the bore of which is suitably secured a substantial tubular or ring seat 4 having a downwardly converging orifice 5 which is complementary to a conic tip 6 of hollow structure.

Mounted in the hollow of the tip 6, in the preferred form of the invention, is a heating device here in the embodiment of a suitably insulated electrically energized heat generative coil unit 7 from which extend electric service wires W, here housed in a tubular stem 8 suitably affixed to the upper end of the tip 6; the stem 8 passing to a suitable degree above the top of the valve shell to provide for ready connection of electric service means to the said wires.

When the assembly of tip and stem is mounted in the valve shell the tip, enclosing the heater 7, is juxtapositioned as to the complementary seat 4 and when the unit heater 7 is energized electrically the developed heat will effectively raise the temperature of the flowing liquid to such a degree as will so decrease the viscosity of the waxy agent that this will freely flow on through the valve orifice 5 even when the flow bean is set to greatly check back the rate of flow.

When so desired the heating element 7 may be mounted directly in the valve seat 4 as depicted in Fig. 2; the element being so located as to effectively heat liquid flowing through the orifice 5 of the seat.

What is claimed is:

In a flow bean valve adapted for use in deep oil wells; a valve shell having a conical valve seat between inlet and outlet openings of the shell, a conical closure member complementary to the said seat, and means for heating said member to reduce viscosity of oil flowing in the valve and consisting of a hollow stem secured in said member and an electric heating unit bodily countersunk in said member and at the lower end of said stem and having electric current feeders extending through the said stem.

FRANK J. SCHWEITZER, JR.

REFERENCES CITED

The following references are of record in the file of this patent:

UNITED STATES PATENTS

| Number | Name | Date |
|---|---|---|
| 1,323,999 | Baker | Dec. 2, 1919 |
| 1,619,817 | Gibson | Mar. 8, 1927 |
| 2,020,492 | Zahm | Nov. 12, 1935 |
| 2,091,874 | Neuhaus | Aug. 31, 1937 |